3,143,565
PROCESS FOR PRODUCTION OF D,L-GLUTAMIC ACID FROM α-KETOGLUTARIC ACID
Gentaro Noyori, Hidehiro Okazaki, Hidemoto Kurokawa, and Makoto Honda, all of Tokyo, Japan, assignors to The Noguchi Institute, Tokyo, Japan, a corporation of Japan
Filed Apr. 19, 1962, Ser. No. 188,795
7 Claims. (Cl. 260—482)

This invention relates to an improved method for production of D,L-glutamic acid from α-ketoglutaric acid. More particularly, this invention relates to a process for providing a D,L-glutamic acid solution in nearly theoretical yield by aminative reduction of α-ketoglutaric acid, salts and/or esters thereof in an ammonia solution in the presence of hydrogenating catalyst or catalysts and in hydrogen atmosphere, wherein portions of the starting material or materials are introduced continuously into the reaction zone at such a rate as to keep the concentration of the starting material or materials as free acid base in the reaction mixture not to exceed 2% by weight, preferably in the range between 0.02 and 2% by weight.

α-Ketoglutaric acid, the starting material, is prepared from furfural through the intermediate, 2,5-dialkoxy-2,5-dihydrofuroic acid or from glucose by fermentation, and is now noted to be an important source of glutamic acid.

In the conventional process of aminative reduction of α-ketoglutaric acid or salts thereof, they were dissolved in aqueous ammonia or aqueous ammonia was added to α-ketoglutaric acid, followed by catalytic reduction to convert α-ketoglutaric acid into D,L-glutamic acid. The catalyst employed was palladium, platinum, reduced nickel or Raney nickel; and heating and superatmospheric pressure were applied in the reduction with the nickel catalyst. However, as well known to the art, this process could not give the product in practically sufficient yield.

Although a variety of improvements such as increasing concentration of ammonia or equivalent ratio of ammonia to α-ketoglutaric acid have been proposed, the difficulties in the conventional method have never been overcome completely.

It is an object of the present invention to provide the improved method for converting α-ketoglutaric acid into D,L-glutamic acid in nearly theoretical yield.

It is another object of the present invention to provide an improved method for producing D,L-glutamic acid, comprising catalytic reduction of α-ketoglutaric acid, salts and/or esters thereof in aqueous and alcoholic ammonia solution in the presence of catalysts such as palladium, platinum, reduced nickel, Raney nickel and the like in hydrogen atmosphere, wherein the starting materials are continuously introduced in the reaction zone at such a rate as to keep the concentration of the unchanged starting material calculated as free acid in the reaction mixture not to exceed 2% by weight, preferably in the range between 0.02 and 2% by weight.

Figure 1:
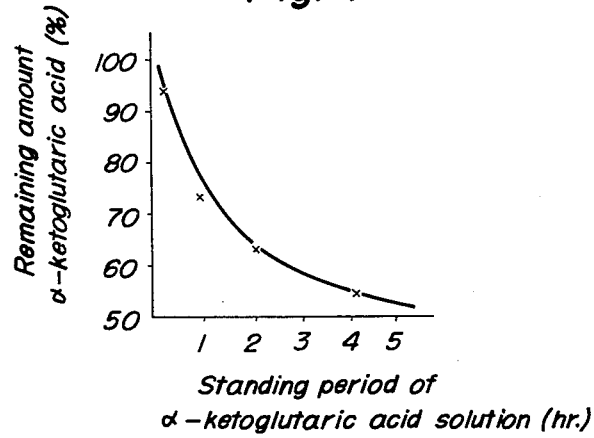

FIG. 1 shows graphically a change of remaining amount of α-ketoglutaric acid initially dissolved to a concentration of 8% by weight in 14% aqueous ammonia and allowed to stand at a temperature of 20°–25° C.; the amount of α-ketoglutaric acid is determined on the basis of 2,4-dinitrophenylhydrazone precipitate obtained by adding a 0.01 N aqueous solution of 2,4-dinitrophenylhydrazine. Substantial same result is obtained with an aqueous sodium hydroxide solution. It is seen from the graph that α-ketoglutaric acid or salts thereof are unstable in an aqueous ammonia solution.

Figure 2:
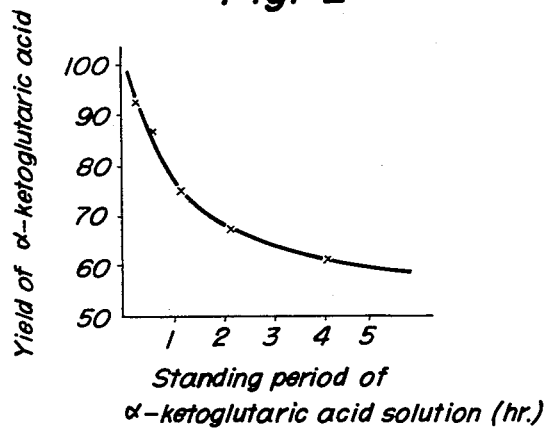

FIG. 2 represents a change in amount of D,L-glutamic acid produced from α-ketoglutaric acid or salts thereof dissolved in the aqueous ammonia and allowed to stand for a period of time prior to catalytic hydrogenation.

Reference to both FIGURES 1 and 2 indicate that the yield of D,L-glutamic acid depends upon standing period of time of α-ketoglutaric acid in an aqueous ammonia solution. From this result, we have found that α-ketoglutaric acid may be converted into D,L-glutamic acid in nearly theoretical yield, when the former is continuously introduced into aqueous ammonia solution at such a rate as to keep the starting material of α-ketoglutaric acid or salts thereof, in the reaction mixture at the minimum concentration. That is, the efficient conversion of α-ketoglutaric acid or salts thereof into D,L-glutamic acid can be effected by subjecting the acid or salts thereof to the conversion as soon as they are introduced into the reaction mixture.

We have observed that the nearly theoretical yield of D,L-glutamic acid is obtained by introducing α-ketoglutaric acid or salts or esters thereof at such a rate as to keep the concentration of the unchanged starting material calculated as free acid in the reaction mixture not to exceed 2%, preferably in the range between 0.02 and 2% by weight, in the process of aminative hydrogenating conversion of α-ketoglutaric acid into D,L-glutamic acid in the presence of catalyst and in hydrogen atmosphere. This improvement is found to greatly contribute to commercial production of glutamic acid, because concentrated glutamic acid solution can be obtained in approximately theoretical yield.

In the process of this invention, as described later in examples, palladium, platinum, Raney nickel, reduced nickel and the like may be employed as the hydrogenating catalyst. α-Ketoglutaric acid, soluble salts thereof including sodium-, potassium-, ammonium salt of α-ketoglutaric acid and the like and lower alkyl esters thereof including methyl-, ethyl-, propyl-, butyl ester of α-ketoglutaric acid and the like are useable as the starting material; water, methyl alcohol, ethyl alcohol and $C_3$–$C_4$ alcohols and the like added with ammonia, as reaction medium.

The catalytic aminative hydrogenation reaction may be carried out at a temperature in the range between 10° C. and 150° C. and in a hydrogen atmosphere at a pressure in the range between 1 and 200 kg./cm.$^2$.

The embodiment of this invention will be described in greater detail in the following specific examples.

*Example 1*

One hundred twenty-three grams of α-ketoglutaric acid (97.8% purity) was neutralized with an aqueous sodium hydroxide solution, made up to 720 ml. with water and added with 780 ml. of 28% aqueous ammonia ($NH_3$ 210 g.)

An aliquot of this solution (250 ml.), containing 20 g. (8%) of α-ketoglutaric acid and 35 g. (14%) of ammonia in molar ratio of 1:15, was employed for a single run of reaction.

In a 500 ml. autoclave, equipped with a vertical magnetic stirrer, were placed 250 ml. of the above prepared solution and 4–5 g. of Raney nickel. After the air in the reactor was displaced with hydrogen gas to a pressure of 65 kg./cm.$^2$, stirring and heating was started. The temperature of reaction zone rose to 60° C. in five minutes and the absorption of hydrogen gas stopped in twenty minutes. The reactor was cooled after ten minutes of additional stirring.

The reaction mixture was filtered to remove the catalyst and the filtrate was evaporated in vacuo at a temperature lower than 60° C. After adding a small amount of aqueous sodium hydroxide, the filtrate was dried up. To the residue were added 150 ml. of water and 50 ml. of concd. aqueous HCl, warmed at a temperature of 70°–80° C. to convert the glutamic acid into HCl-salt, treated with activated carbon, filtered, transferred into a 500 ml. volumetric cylinder and made up to 500 ml. with water. Two ml. of the final solution was taken and assayed by Pope and Stevens method for glutamic acid.

The above reaction was run with five 250 ml. portions of the solution, each of which was allowed to stand for predetermined period of time and assayed for the content of α-ketoglutaric acid just before the hydrogenation, by the amount of precipitate obtained by mixing 4 ml. of the solution and 300 ml. of a 0.01 N aqueous 2,4-dinitrophenylhydrazine solution. The result of five runs of the reaction was shown in the following table.

| Standing period of the α-ketoglutaric acid solution (hour) | Temperature of reaction (° C.) | Period for hydrogen gas absorption (min.) | Initial pressure of hydrogen gas (kg./cm.$^2$) | Yield of glutamic acid | | Content of the unchanged α-ketoglutaric acid before the reaction in percent ratio to the initial content |
| --- | --- | --- | --- | --- | --- | --- |
| | | | | (G.) | (Percent) | |
| 0.25 | 60±5 | 20 | 65 | 18.8 | 93.5 | 94.5 |
| 0.5 | 60±5 | 20 | 65 | 17.8 | 88.6 | 88.0 |
| 1 | 60±5 | 20 | 65 | 15.2 | 75.7 | 73.2 |
| 2 | 60±5 | 20 | 65 | 13.9 | 69.2 | 63.6 |
| 4 | 60±5 | 20 | 65 | 12.7 | 63.4 | 54.8 |

The result shows the content of α-ketoglutaric acid in the starting solution and the yield of glutamic acid therefrom decreased along with the standing period of the α-ketoglutaric acid solution.

*Example 2*

In a 500 ml. autoclave, equipped with a vertical magnetic stirrer, were placed 62.5 ml. of 28% aqueous ammonia and 4–5 g. of Raney-nickel catalyst. After the air in the reactor was displaced with hydrogen gas to a pressure of 30 kg./cm.$^2$, the reaction mixture was stirred and heated to a temperature of 60° C. After the constant temperature having been assured, 87.5 ml. of 34.3% aqueous solution of disodium α-ketoglutarate was introduced continuously by a pump over a period of 60 min.; at a rate of 0.5 g./min. so that the concentration of unchanged α-ketoglutaric acid in the reaction mixture was kept at about 0.89%. Absorption of hydrogen ceased soon after all the material had been added.

The reaction mixture was filtered to remove the catalyst; the filtrate was evaporated in vacuo at a temperature lower than 60° C. After adding a small amount of aqueous sodium hydroxide, the filtrate was dried up completely. To the residue were added 150 ml. of water and 50 ml. concd. HCl, kept at a temperature of 70–80° C. for converting the glutamic acid into HCl-salt, treated with activated carbon, filtered and transferred into a 500 ml. volumetric cylinder to be filled up to 500 ml. An aliquot of 2 ml. was pipetted out for determining glutamic acid by Pope and Stevens method.

The remaining solution was adjusted at pH 3.2 to crystallize glutamic acid. The following table shows the nearly theoretical yield for glutamic acid obtained by this procedure.

*Example 3*

In a 500 ml. autoclave, equipped with a vertical magnetic stirrer, were placed 62.5 ml. of 28% aqueous ammonia and 3 g. of palladium-black catalyst. Hydrogenation was carried out in the hydrogen gas at a pressure of 3 kg./cm.$^2$ and ordinary temperature. Aqueous solution of α-ketoglutaric acid (90 ml., 25.6%) was introduced at a rate of 0.38 g. α-ketoglutaric acid/min. by a pump over a period of 60 min. to keep the concentration of the unchanged material at about 0.7% by weight in the course of the reaction. The reaction mixture was treated as described in the preceeding examples; the glutamic acid was assayed by Pope and Stevens method and crystals were obtained by adjusting pH at 3.2. The yield: 22.0 g. (95.0%).

*Example 4*

In a 500 ml. autoclave, equipped with a vertical magnetic stirrer, were placed 250 ml. of alcohol added with 25 g. NH$_3$ and 2 g. of platinum catalyst. The hydrogenation was carried out in a hydrogen pressure of 3 kg./cm.$^2$ at ordinary temperature. Diethyl α-ketoglutarate (24.2 g.) was added continuously at a rate of 0.4 g./min. so as to keep the concentration in the reaction mixture lower than 0.4%. In the course of the reaction, hydrogen gas was introduced five times into the reactor. The reaction mixture thus obtained was treated as described in the preceeding examples; yield of glutamic acid, 13.7 g. (93.5%).

Intermittent affording ammonia, hydrogen gas and diethyl α-ketoglutarate into the reactor in the course of the reaction may yield further amount of a solution containing glutamic acid at a high concentration.

*Example 5*

In a 500 ml. autoclave, equipped with a vertical magnetic stirrer, were mixed 125 ml. of 28% aqueous ammonia, 3 g. of Raney nickel and 16.5 ml. of 34.3% aqueous solution of disodium α-ketoglutarate to give an aqueous ammonia containing 4% by weight of disodium α-ketoglutarate. The air in the reactor was displaced with hydrogen gas to a pressure of 60 kg./cm.$^2$; the reaction zone was heated to a temperature of 60° C. After the constant temperature having been assured, 158.5 ml. of the 34.3% solution of disodium α-ketoglutarate was introduced into the reactor continuously over 32 min.; the rate of addition being regulated so as to keep the concentra-

| Total amount of α-ketoglutaric acid introduced in the reaction zone (g.) | Max. concentration of α-ketoglutaric acid in the reaction mixture in the course of reaction (percent) | Period for adding all the α-ketoglutaric acid (min.) | Reaction temperature (° C.) | Initial hydrogen pressure (kg./cm.$^2$) | Total volume of reaction mixture (ml.) | Final concentration of glutamic acid (percent) | Final concentration of ammonia (percent) | Yield of glutamic acid | |
| --- | --- | --- | --- | --- | --- | --- | --- | --- | --- |
| | | | | | | | | (G.) | (Percent) |
| 30 | 0.89 | 60 | 60±2.0 | 30 | 150 | 20 | 11.6 | 29.8 | 98.8 |
| 30 | 1.78 | 30 | 60±2.0 | 30 | 150 | 20 | 11.6 | 28.0 | 92.8 | tion of the unchanged disodium α-ketoglutarate in the reaction mixture at about 4%, based on the consuming rate of α-ketoglutaric acid as calculated from dropping rate of hydrogen pressure.

After hydrogen absorption stopped, the content of the reactor was treated and assayed for glutamic acid content as described in the above examples. Yield of glutamic acid: 41.2 g. (88.3%).

We claim:
1. A process for the production of a member of the group consisting of D,L-glutamic acid, lower alkyl esters thereof and salts thereof by catalytic aminative hydrogenation which comprises continuously introducing a starting material selected from the group consisting of α-ketoglutaric acid, lower alkyl esters of α-ketoglutaric acid and salts of α-ketoglutaric acid respectively, to a reaction medium selected from the group consisting of an ammonia solution in water and an ammonia solution in an alkanol having up to four carbon atoms, at a temperature of the order of 10° C. to 150° C. in the presence of a hydrogenating catalyst, and in a hydrogen atmosphere at a pressure of about 1–200 kg./cm.$^2$, wherein said starting material is introduced at such a rate to said reaction medium as to keep the concentration of unchanged starting material calculated as free acid in the reaction mixture, not to exceed 2% by weight.

2. A process according to claim 1, wherein said starting material is dissolved in a solvent selected from the group consisting of water and alkanols having up to four carbon atoms.

3. A process for the production of D,L-glumatic acid by catalytic aminative hydrogenation comprising continuously introducing α-ketoglutaric acid to a reaction medium selected from the group consisting of an ammonia solution in water and an ammonia solution in an alkanol having up to four carbon atoms, at a temperature of the order of 10° C. to 150° C. in the presence of a hydrogenating catalyst, and in a hydrogen atmosphere at a pressure of about 1–200 kg./cm.$^2$, wherein said starting material is introduced at such a rate to said reaction medium as to keep the concentration of unchanged starting material calculated as free acid in the reaction mixture not to exceed 2% by weight.

4. A process for the production of a salt of glutamic acid by catalytic aminative hydrogenation which comprises continuously introducting a salt of α-ketoglutaric acid to a reaction medium selected from the group of an ammonia solution in water and an ammonia solution in an alkanol having up to four carbon atoms, at a temperature of the order of 10° C. to 150° C., in the presence of a hydrogenating catalyst, and in a hydrogen atmosphere at a pressure of about 1–200 kg./cm.$^2$, wherein said starting material is introduced at such a rate to said reaction medium as to keep the concentration of unchanged starting material calculated as free acid in the reaction mixture, not to exceed 2% by weight.

5. A process for the production of the disodium salt D,L-glutamic acid by catalytic aminative hydrogenation which comprises continuously introducing an aqueous solution of disodium α-ketoglutarate to a reaction medium selected from the group consisting of an ammonia solution in water and an ammonia solution in an alkanol having up to four carbon atoms, at a temperature of the order of 10° C. to 150° C. in the presence of a hydrogenating catalyst, and in a hydrogen atmosphere at a pressure of about 1–200 kg./cm.$^2$, wherein said starting material is introduced at such a rate to said reaction medium as to keep the concentration of unchanged starting material calculated as free acid in the reaction mixture not to exceed 2% by weight.

6. A process for the production of a lower alkyl ester of glutamic acid by catalytic aminative hydrogenation which comprises continuously introducing a lower alkyl ester of α-ketoglutaric acid to a reaction medium selected from the group consisting of an ammonia solution in water and an ammonia solution in an alkanol having up to four carbon atoms, at a temperature of the order of 10° C. to 150° C., in the presence of a hydrogenating catalyst, and in a hydrogen atmosphere at a pressure of about 1–200 kg./cm.$^2$, wherein said starting material is introduced at such a rate to said reaction medium as to keep the concentration of unchanged starting material calculated as free acid in the reaction mixture, not to exceed 2% by weight.

7. A process for the production of the diethyl ester of D,L-glutamic acid by catalytic aminative hydrogenation which comprises continuously introducing diethyl α-ketoglutarate to a reaction medium selected from the group consisting of an ammonia solution in water and an ammonia solution in an alkanol having up to four carbon atoms, at a temperature of the order of 10° C. to 150° C. in the presence of a hydrogenating catalyst, and in a hydrogen atmosphere at a pressure of about 1–200 kg./cm.$^2$, wherein said starting material is introduced at such a rate to said reaction medium as to keep the concentration of unchanged starting material calculated as free acid in the reaction mixture not to exceed 2% by weight.

References Cited in the file of this patent
UNITED STATES PATENTS
2,610,212    Floyd _____ Sept. 9, 1952